(12) United States Patent
Zabezhinsky

(10) Patent No.: US 7,362,779 B1
(45) Date of Patent: Apr. 22, 2008

(54) TRANSMISSION OF DATA FRAMES AS A PLURALITY OF SUBFRAMES OVER A PLURALITY OF CHANNELS

(75) Inventor: Vladimir Zabezhinsky, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1151 days.

(21) Appl. No.: 10/054,525

(22) Filed: Jan. 22, 2002

(51) Int. Cl.
*H04J 3/06* (2006.01)
*H04J 3/04* (2006.01)

(52) U.S. Cl. ........................ 370/512; 370/536

(58) Field of Classification Search ............... 370/470, 370/472, 512
See application file for complete search history.

(56) References Cited

U.S. PATENT DOCUMENTS

| | | | | |
|---|---|---|---|---|
| 4,143,406 A * | 3/1979 | Tsuiki et al. | .............. | 360/48 |
| 4,601,045 A * | 7/1986 | Lubarsky | .............. | 375/260 |
| 4,984,238 A * | 1/1991 | Watanabe et al. | .............. | 370/509 |
| 5,293,378 A * | 3/1994 | Shimizu | .............. | 370/474 |
| 5,351,239 A * | 9/1994 | Black et al. | .............. | 370/476 |
| 5,461,622 A * | 10/1995 | Bleickardt et al. | .............. | 370/470 |
| 5,940,863 A * | 8/1999 | Fimoff et al. | .............. | 711/157 |
| 6,112,324 A * | 8/2000 | Howe et al. | .............. | 714/763 |
| 6,625,176 B1 * | 9/2003 | Amann et al. | .............. | 370/503 |
| 6,795,451 B1 * | 9/2004 | Giorgetta et al. | .............. | 370/510 |
| 6,931,009 B1 * | 8/2005 | Agarwal | .............. | 370/395.1 |
| 2002/0097752 A1 * | 7/2002 | Jones et al. | .............. | 370/506 |
| 2005/0152456 A1 * | 7/2005 | Orchard et al. | .............. | 375/240.24 |

OTHER PUBLICATIONS

Author Unknown, "Interfaces for the Optical Transport Network (OTN)", G.709/Y.1331, ITU-T Telecommunication Standardization Sector of International Telecommunication Union, Feb. 10, 2001, 85 pages.

* cited by examiner

*Primary Examiner*—Daniel J. Ryman
(74) *Attorney, Agent, or Firm*—Incaplaw; Terrance A. Meador

(57) ABSTRACT

A data communication system includes a rotating deinterleaver that reformats incoming data frames into a plurality of data subframes. The data contained in the incoming data frames is deinterleaved according to a protocol that distributes frame alignment signals periodically within the individual data subframes. The distribution of the frame alignment signals in the data subframes facilitates subframe alignment and subsequent recreation of the data frames from the data contained in the data subframes.

21 Claims, 6 Drawing Sheets

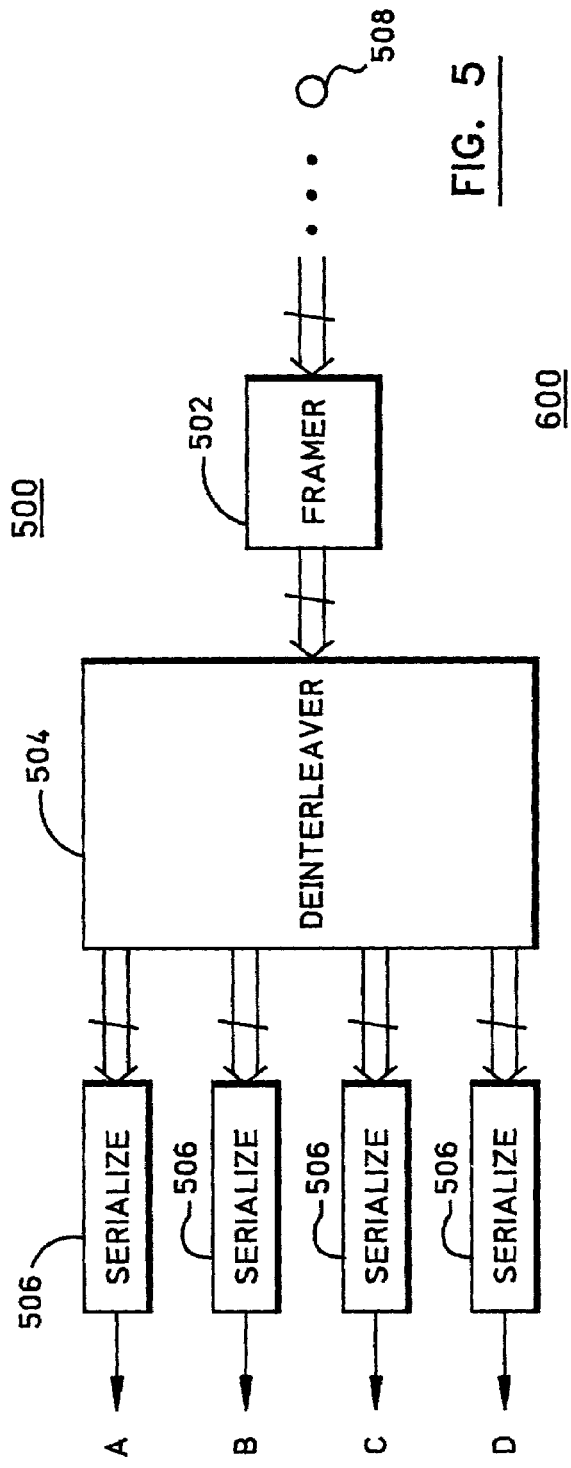
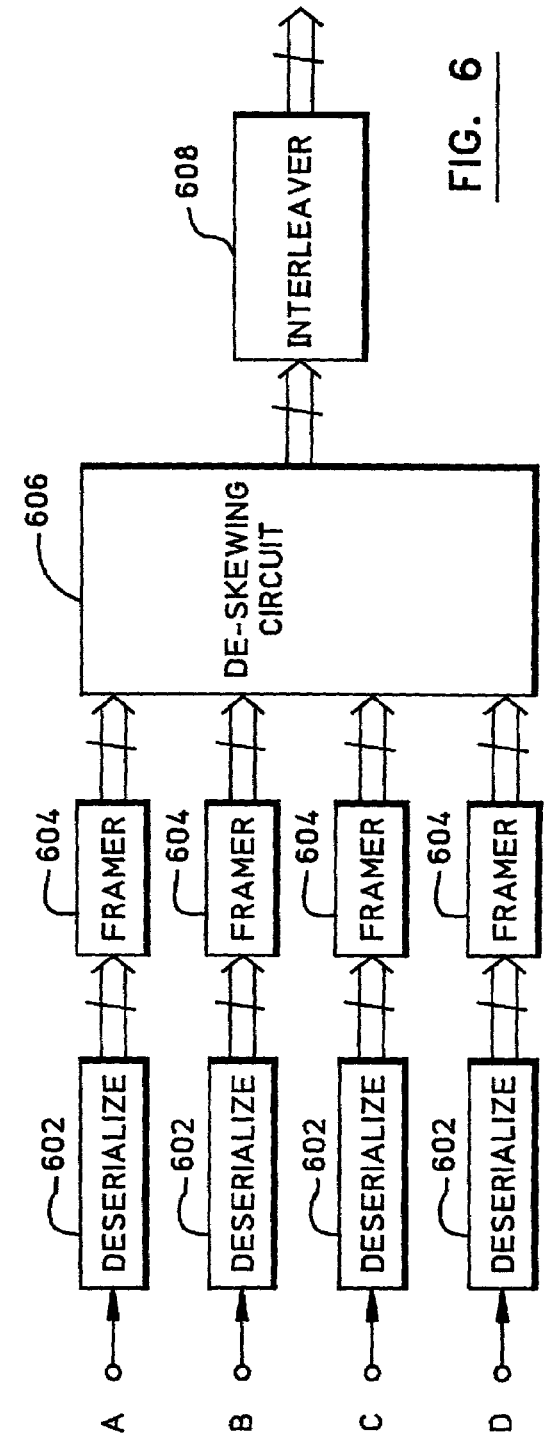

US 7,362,779 B1

TRANSMISSION OF DATA FRAMES AS A PLURALITY OF SUBFRAMES OVER A PLURALITY OF CHANNELS

FIELD OF THE INVENTION

The present invention relates generally to data communication systems. More particularly, the present invention relates to the transmission of framed data having a limited number of frame alignment bytes over a plurality of channels.

BACKGROUND OF THE INVENTION

"Digital wrapper" frames, as described in ITU-T Recommendation G.709/Y.1331 (International Telecommunication Union, February 2001), are intended to be transferred over optical links with bit rates of up to 10 Gigabits/second (Gbps). Each Digital Wrapper frame contains 16,320 bytes, only six of which are devoted to frame synchronization. In practical applications, electrical switching and/or routing equipment (such as serial backplanes) must transmit digital wrapper frame data using relatively low bandwidth electrical channels. For example, it may be desirable to transmit digital wrapper frame data over four 2.5 Gbps channels supported by a serial backplane interface. In view of the limited number of frame alignment bytes contained in each digital wrapper frame, the digital wrapper frame data cannot be simply divided for transmission over four channels—the individual channels will not be able to synchronize using only six frame alignment bytes.

One known technique provides framing for serial backplane lines transmitting digital wrapper frame data by replacing some of the forward error correction parity bytes within the digital wrapper frames with frame alignment bytes. Using this technique, each of the serial backplane channels is provided with a number of frame alignment bytes sufficient to establish synchronization. The cost of this frame alignment technique is the loss of forward error correction parity information and, consequently, increased data transmission errors.

BRIEF SUMMARY OF THE INVENTION

A data framing structure and related data communication methods according to the present invention can be utilized to transmit digital wrapper data frames over a plurality of lower bandwidth channels. The inventive technique utilizes the same number of frame alignment bytes contained in each digital wrapper frame and distributes the frame alignment bytes to facilitate frame synchronization in each of the lower bandwidth channels. The frame alignment technique manipulates digital wrapper frame data to allow the transmission of such data over serial backplane lines with no loss of information, while providing frame synchronization information for all of the serial backplane channels.

The above and other aspects of the present invention may be carried out in one form by a distributed data framing structure for the transmission of data frames over N channels, each data frame being represented by L bytes. The distributed data frame structure comprises N subframe structures, each corresponding to one of the channels, a number of bytes from each data frame distributed among the subframe structures, and a frame alignment signal comprising a pattern of bits, where the frame alignment signal occurs every L bytes in each of the channels.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

FIG. 5 is a schematic representation of a data communication apparatus configured to transmit data;

FIG. 6 is a schematic representation of a data communication apparatus configured to receive data;

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for data transmission, signal switching and routing, frame synchronization, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

Figure 1:
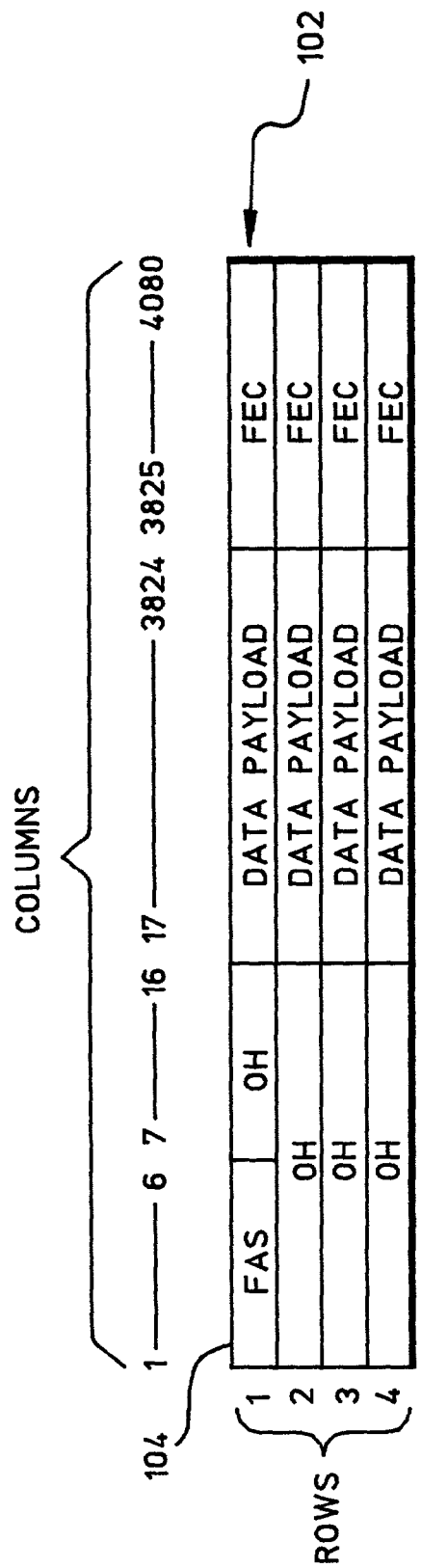
FIG. 1 is a diagram of a digital wrapper data frame structure.

FIG. 1 is a diagram of a digital wrapper data frame structure 100, as formatted in accordance with ITU-T Recommendation G.709/Y.1331. The preferred practical embodiment of the present invention processes digital wrapper data frames (at 10 Gbps) and reformats the data for transmission over four lower bandwidth serial backplane channels (each at 2.5 Gbps). The present invention is described herein in connection with this example embodiment. The techniques of the present invention, however, are not limited to the transmission of digital wrapper frames. Indeed, the present invention may be applied in the context of: incoming data formatted in accordance with alternative frame formats; incoming data received at different data rates; separation of the incoming data into any number of channels; reformatting the incoming data for transmission at any desired data rate; and processing incoming data containing any number of frame alignment bytes.

In practice, digital data transmitted via optical transport networks is formatted in accordance with data frame structure 100. In the optical domain, the data contained in data frame structure 100 is transmitted at a nominal rate of 10 Gbps, and any number of such data frame structures can be transmitted in sequence. Data frame structure 100 contains 16,320 bytes of data; each byte includes eight binary bits. Data frame structure 100 is divided into four rows, each having 4,080 bytes. The first 16 bytes in each row are reserved for overhead data, bytes 17 through 3,824 in each row are utilized for the data payload, and bytes 3,825 through 4,080 in each row are devoted to forward error correction (FEC). ITU-T Recommendation G.709/Y.1331 uses the term "column" to refer to the 4,080 byte positions within any given row.

The first row 102 in data frame structure 100 contains a frame alignment signal (FAS) 104. As shown in FIG. 1, FAS 104 appears at the beginning of data frame structure 100 (bytes 1-6 in first row 102). FAS 104 is a repeatable and recognizable pattern of bits that is detected by the receiver device to establish frame synchronization. Digital wrapper data frame structure 100 utilizes the following pattern (of hexadecimal values) for FAS 104: F6, F6, F6, 28, 28, 28. In accordance with conventional terminology, FAS 104 contains three "A1" bytes followed by three "A2" bytes. Alternatively, any recognizable pattern of bits can be utilized for FAS 104. When the optical transport network transmits digital wrapper frames, the receiver establishes frame synchronization by periodically detecting FAS 104 at the beginning of each frame. Once frame alignment has been established, the receiver can extract the data payload, process the overhead bytes, and process the FEC bytes in a suitable manner.

Figure 2:
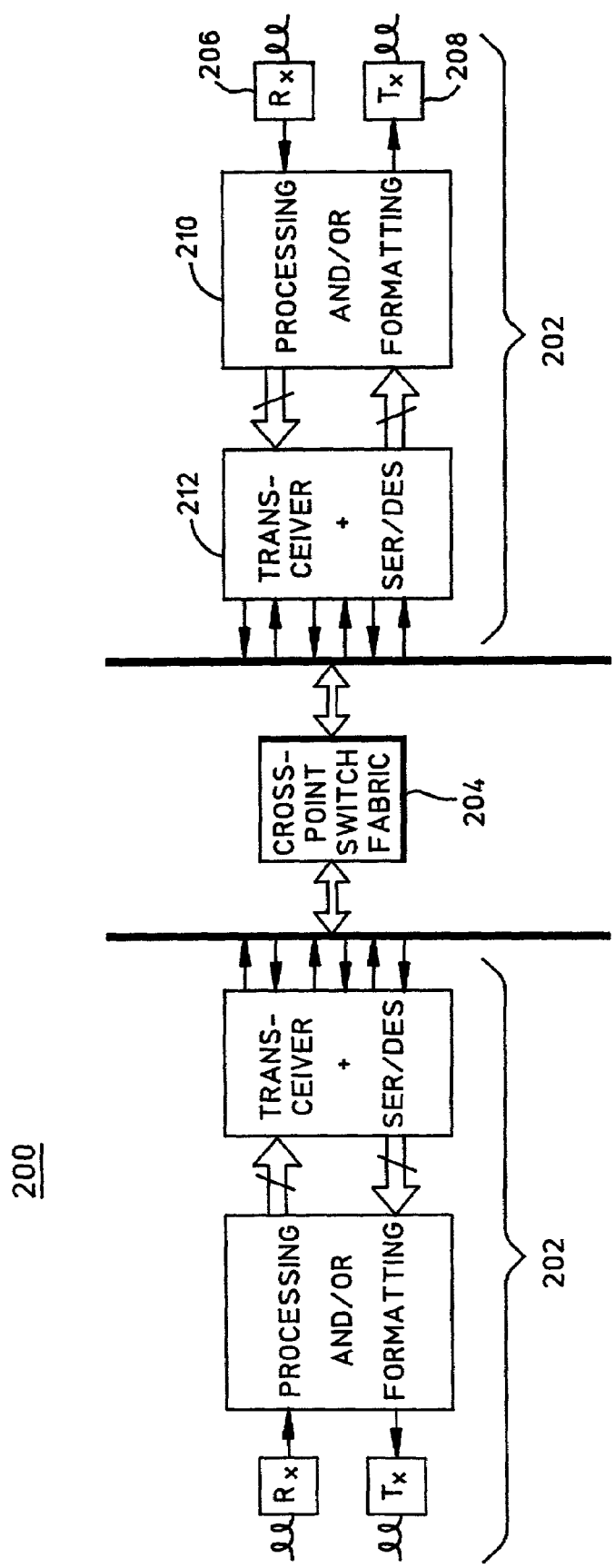
FIG. 2 is a schematic representation of a serial backplane architecture in which the techniques of the present invention may be implemented.

Digital wrapper data frames formatted in accordance with data frame structure 100 can be transmitted and received by a number of data communication devices. For example, such data frames can be received, processed, and transmitted by switching or routing equipment. In this regard, FIG. 2 is a schematic representation of a simplified serial backplane architecture 200 in which the techniques of the present invention may be implemented. Briefly, serial backplane architecture 200 receives digital wrapper data frames via optical transmission lines, converts the high frequency optical signals into lower frequency electrical signals, and routes data over the electrical lines, from one port to another port. The destination port converts the electrical signals back into optical signals for further transmission.

Serial backplane architecture 200 may include any number of port cards 202 configured to communicate with one another via a crosspoint switch fabric 204. For the sake of simplicity, FIG. 2 only depicts two port cards 202. Port card 202 generally includes a receiver 206, a transmitter 208, one or more components 210 related to data processing and/or data formatting, and a transceiver 212 that also functions as a serializer/deserializer. Depending upon the particular application, port card 202 may be alternately configured and the techniques of the present invention are not limited to the example architecture shown in FIG. 2.

Receiver 206 receives data frames via an optical conductor and transforms the optical signal into an electrical signal. Conversely, transmitter 208 receives data on an electrical conductor and transforms the electrical signal into an optical signal for transmission via an optical conductor. In the example embodiment described herein, receiver 206 is capable of receiving data frames formatted in accordance with digital wrapper data frame structure 100, and transmitter 208 is capable of transmitting data frames formatted in accordance with data frame structure 100. In this regard, receiver 206 receives data at the relatively high rate of 10 Gbps and transmitter 208 transmits data at 10 Gbps.

Processing/formatting component 210 may be configured to perform a number of functions. For example, component 210 may include a clock recovery circuit for extracting a clock signal from the electrical data signal obtained from receiver 206. In addition, component 210 may include a serial to parallel converter that converts the serial data signal obtained from receiver 206 into a parallel output. In the example embodiment, component 210 generates a parallel output that is 16 bits wide. In the outgoing direction, component 210 may include a parallel to serial converter and a clock generation circuit such that the electrical signal fed to transmitter 208 is a serial data signal containing a suitable clock signal. Component 210 may also be configured to perform the FEC encoding (and decoding) associated with digital wrapper data frames. In this example, the 16-bit wide digital output of component 210 is formatted in accordance with data frame structure 100; this output is received by transceiver 212. In the outgoing direction, processing/formatting component 210 receives a 16-bit wide digital signal from transceiver 212.

Transceiver 212 includes a transmit leg and a receive leg (described in more detail below). Briefly, the transmit leg receives the parallel data from processing/formatting component 210 and separates the data for transmission over a plurality of relatively low speed electrical channels. In the example embodiment described herein, transceiver 212 reformats the incoming data for serial transmission over four 2.5 Gbps channels. The receive leg obtains serial data from the plurality of channels, aligns the data, and "repackages" the data into the data frame structure utilized by the communication system. Notably, transceiver 212 is configured to rearrange the data contained in the digital wrapper frame in a manner that enables the destination receiver leg to acquire frame synchronization for each of the lower speed channels. Transceiver 212 accomplishes this goal without adding any overhead bytes and without sacrificing any data payload bytes or FEC bytes.

Figure 3:
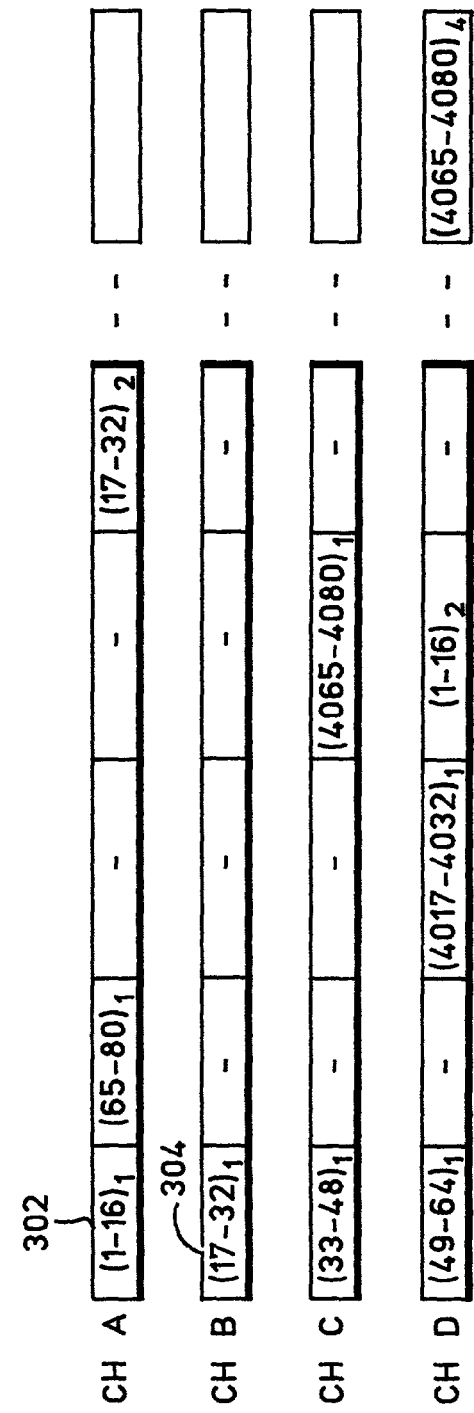
FIG. 3 is a diagram that illustrates the manner in which a digital wrapper data frame can be transmitted over four separate channels.
Figure 4:
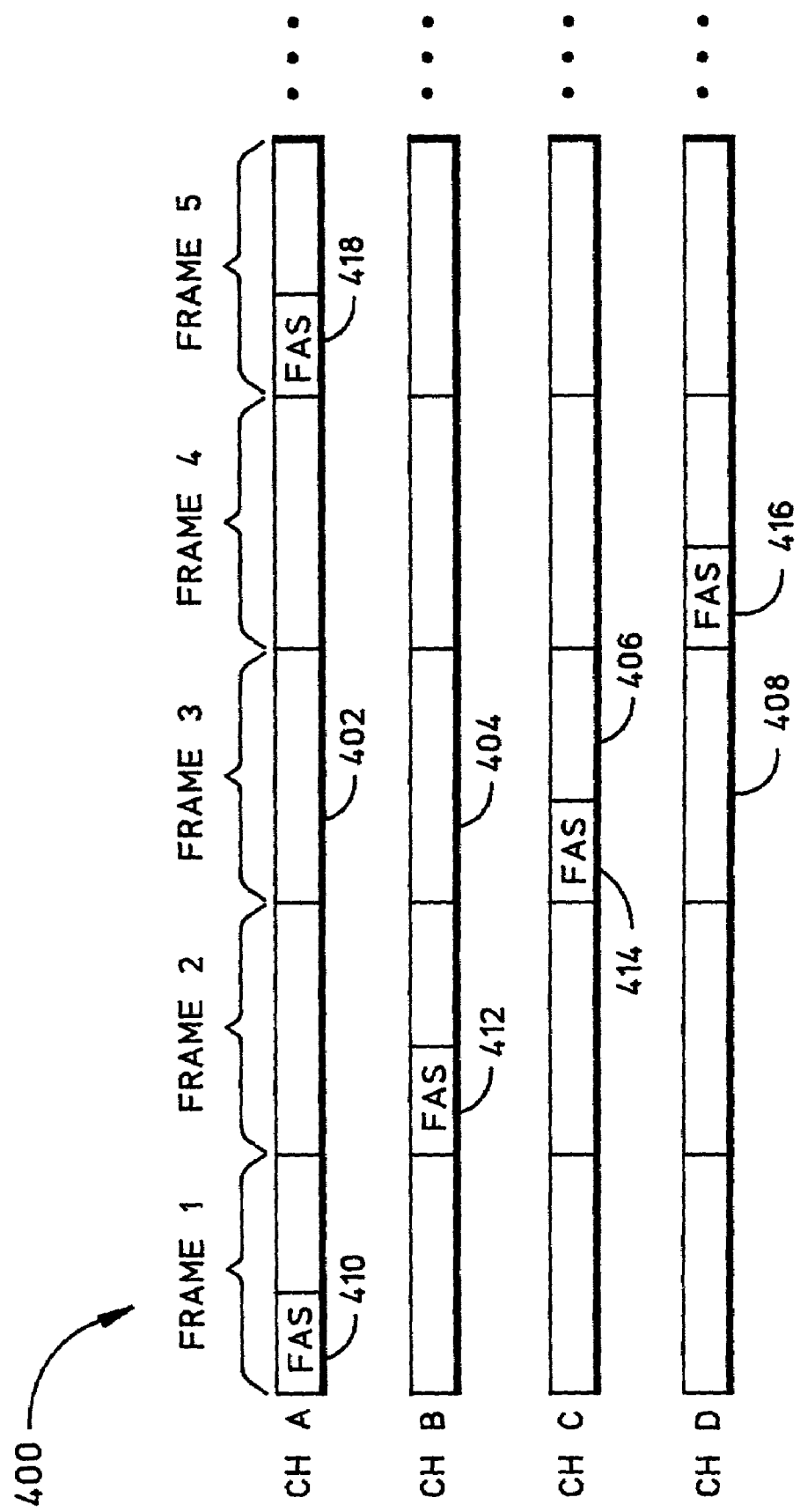
FIG. 4 is a diagram that illustrates a frame alignment signal pattern corresponding to the transmission of data depicted in FIG. 3.

As mentioned above, the data communication techniques of the present invention can be utilized to receive data formatted in accordance with a known data frame structure via an input channel, reformat the data, and transmit the data via a plurality of output channels (each having a lower bandwidth than the input channel). In this regard, FIG. 3 is a diagram that illustrates the manner in which a digital wrapper data frame can be transmitted over four separate channels, and FIG. 4 is a diagram that illustrates a frame alignment signal pattern corresponding to the transmission of data depicted in FIG. 3. FIG. 3 and FIG. 4 serve to illustrate only one example embodiment of the present invention and are not intended to limit or restrict the scope of the invention in any way. Indeed, the concepts described herein can be extended for use with data frame structures other than digital wrapper frames and for use with any number of lower bandwidth channels.

FIG. 3 depicts four channels (channels A, B, C, and D). In a practical embodiment, each of these channels corresponds to a separate physical electrical channel. The incoming data frames are rearranged/reformatted into a distributed data frame structure for transmission over these separate channels. In the example embodiment, transceiver 212 receives digital wrapper data frames (see FIG. 1) at 10 Gbps, and transmits the reformatted data at 2.5 Gbps on each of the four channels. A first channel, e.g., channel A is utilized to transmit the first 16 bytes in the incoming data frame. This initial group of bytes is identified by reference number 302 in FIG. 3. Notably, byte group 302 will contain FAS 104, which occurs as the first six bytes in each digital wrapper frame, along with 10 additional overhead bytes. The next 16 bytes in the input data frame (i.e., bytes 17-32 in the first row of the input data frame) are transmitted on channel B. This group of bytes is identified by reference number 304 in FIG. 3. Following this protocol, bytes 33-48 in the input data frame are transmitted on channel C, and bytes 49-64 in the input data frame are transmitted on channel D.

The next 16 bytes (i.e., bytes 65-80 in the first row of the incoming data frame) are transmitted on channel A because channel D is the fourth and last channel of the sequence. In this manner, all of the bytes in the first row of the input data frame are deinterleaved throughout the four channels. In the example shown in FIG. 3, bytes 4065-4080 in the first row of the input data frame will be transmitted on channel C. Thereafter, the first 16 bytes in the second row of the input data frame are transmitted on channel D. This group of bytes is identified by reference number 306 in FIG. 3. This protocol is followed to distribute all four rows of the input data frame among the four channels (FIG. 3 depicts an abbreviated data frame structure; the last 16 bytes in the fourth row of the data frame are transmitted on channel D).

In a practical data communication system, the incoming data frames arrive in a substantially continuous sequence and, under normal operating conditions, the incoming data frames are aligned or synchronized. Consequently, transceiver 212 is preferably configured to process and reformat any number of input data frames (e.g., digital wrapper frames) as they arrive. In this regard, transceiver 212 utilizes a rotating deinterleaving technique that distributes FAS patterns throughout the plurality of lower bandwidth channels. The systematic distribution of FAS patterns among the plurality of channels enables the destination transceiver to establish frame synchronization for each of the individual channels. FIG. 4 depicts an example FAS distribution pattern that may be generated by transceiver 212. FIG. 4 represents a distributed data frame structure 400 for the transmission of data over a plurality of channels.

The data contained in a plurality of data frames, e.g., digital wrapper frames, is rearranged to create distributed data frame structure 400. In this example, distributed data frame structure 400 includes four subframe structures, each corresponding to one of the four lower bandwidth channels: channel A corresponds to a subframe structure 402, channel B corresponds to a subframe structure 404, channel C corresponds to a subframe structure 406, and channel D corresponds to a subframe structure 408. The bytes from each input data frame (the digital wrapper frames in the preferred embodiment) are distributed among the four subframe structures, as described above in connection with FIG. 3 and as described in further detail below. In the example embodiment described herein, each input data frame is formatted in accordance with ITU-T Recommendation G.709/Y.1331, and groups of 16 consecutive bytes are taken from the incoming data frame for transmission on any given channel.

As described above in connection with FIG. 3, assuming that channel A is the reference index channel, a FAS 410 (corresponding to the FAS in the first incoming data frame) will occur in channel A. The remainder of the bytes in the first incoming data frame are deinterleaved into subframe structures 402/404/406/408. Next, the channel sequence is incremented such that the first 16 bytes from the second incoming data frame are transmitted over channel B. Thus, in the example embodiment, a FAS 412 (corresponding to the FAS in the second incoming data frame) will occur in channel B. The remainder of the bytes in the second incoming data frame are deinterleaved into the four subframe structures. In accordance with this protocol, distributed data frame structure 400 includes a FAS 414 (corresponding to the FAS in the third incoming data frame) in subframe structure 406 and a FAS 416 (corresponding to the FAS in the fourth incoming data frame) in subframe structure 408. As shown in FIG. 4, the location of the first 16 bytes from an incoming data frame rotates in sequence through the four subframe structures. In the example embodiment where each incoming data frame includes only one FAS, the position of the FAS also rotates through the four subframe structures. Consequently, after four incoming data frames have been processed, the FAS from the fifth incoming data frame appears in the first subframe structure (identified as FAS 418 in FIG. 4). The next FAS will appear in the second subframe structure, and so on.

Transceiver 212 performs the rotating deinterleaving procedure on a plurality of incoming data frames to establish the distributed data frame structure 400, in which a FAS occurs every 16,320 bytes in each of the four channels. In this regard, the rotating deinterleaving procedure distributes the FAS periodically within each of the subframe structures, and the destination transceiver can establish frame synchronization for each individual channel based on the detected FAS.

In general terms, a distributed data frame structure according to the present invention represents a reformatting of an input data frame containing L bytes in a manner that enables the transmission of data over N channels. The distributed data frame structure includes N subframe structures, each corresponding to one of the N channels. The first B bytes from the first input data frame are assigned to a reference location in the first subframe structure, and the remainder of the bytes in the first incoming data frame are deinterleaved into the N subframe structures in groups of B bytes. The location of the first B bytes from an incoming data frame rotates in sequence through the N subframe structures.

The incoming data frame is received at a first data rate, and each of the subframe structures is transmitted over the respective channel at a second data rate that is less than the first data rate. In the preferred embodiment, data is transmitted on each channel at approximately the same the data rate. For the example embodiment described herein, the incoming digital wrapper frames are received at a data rate of 10 Gbps, and each of the four channels transmits data at a rate of 2.5 Gbps. Consequently, the effective combined data rate of the four channels is equal to 10 Gbps.

FIG. 5 is a schematic representation of a data communication apparatus 500 configured to transmit data. Data communication apparatus 500 may be realized as a transmitter device or in a transceiver device in a practical implementation. In this regard, transceiver 212 may comprise the elements and/or functionality of data communication apparatus 500. Apparatus 500 generally includes a framer 502, a rotating deinterleaver 504, and a plurality of serializers 506. For consistency with the example embodiment described herein, apparatus 500 includes four serializers corresponding to four transmit channels.

Data communication apparatus 500 may include an input port or node 508 for obtaining a plurality of data frames at a first data rate, e.g., digital wrapper frames received at 10 Gbps. In accordance with one practical embodiment, input node 508 receives a 16 bit wide parallel data signal. Eventually, the incoming data frames are presented to framer 502, which is configured to align the incoming data frames. In the practical embodiment, framer 502 detects the FAS contained in the digital wrapper frames and performs conventional frame synchronization techniques to align the frames. The aligned input data frames are processed by rotating deinterleaver 504 in accordance with the rotating deinterleaving procedure described herein. Briefly, rotating deinterleaver 504 is configured to reformat the incoming data frames into a plurality of subframe structures, each corresponding to one of the different transmission channels.

In the practical embodiment, rotating deinterleaver 504 generates a 16 bit wide parallel output signal for each of the transmit channels. For deployment in a serial backplane architecture (see FIG. 2), each of the parallel output signals from rotating deinterleaver 504 is processed by a respective serializer 506; each serializer is directly or indirectly coupled to rotating deinterleaver 504. Each serializer is configured to generate serial data representing one of the subframe structures. In other words, each serializer generates a serial stream of digital data for transmission over the respective channel. The serial data streams are each transmitted at a second data rate that is less than the data rate of the incoming data frame. The overall combined data rate of the serializers 506 is equal to the data rate of the input data frames.

FIG. 6 is a schematic representation of a data communication apparatus 600 configured to receive data. Data communication apparatus 600 may be realized as a receiver device or in a transceiver device in a practical implementation. In this regard, transceiver 212 may comprise the elements and/or functionality of data communication apparatus 600. Apparatus 600 generally includes a plurality of deserializers 602, a plurality of framers 604, a de-skewing circuit 606, and a rotating interleaver 608. For consistency with the example embodiment described herein, apparatus 600 includes four deserializers corresponding to four transmit channels.

Data communication apparatus 600 may include one or more input nodes or ports for obtaining a plurality of subframe structures from a plurality of channels. In the example embodiment, each of the four input channels is received at an input node. Deserializers 602 may be utilized to convert the received serial data streams into equivalent parallel data outputs. In the example embodiment, each deserializer 602 generates a 16 bit wide parallel data signal. The output of each deserializer 602 is presented to a respective framer 604, which is suitably configured to frame each of the subframe structures to obtain aligned subframe structures. As described above, the distributed FAS contained in each subframe structure enables framers 604 to perform subframe alignment. The individual outputs of framers 604 are presented to de-skewing circuit 606.

De-skewing circuit 606 is configured to de-skew the aligned subframe structures such that the data contained in the subframe structures can be properly extracted in a synchronized manner. De-skewing circuit 606 adjusts the timing of the subframe data such that the correct bytes are available at the respective clock pulse. De-skewing circuit 606 processes groups of bytes, which are received sequentially on all of the N channels. In a practical embodiment, de-skewing circuit 606 processes these groups of bytes beginning at the same clock cycle. In accordance with one practical embodiment, de-skewing circuit 606 employs FIFO memory logic having adjustable read/write pointers that facilitate alignment of the channel data. De-skewing circuit 606 can process clock signals recovered from the individual data signals and frame pulses generated by framers 604 to accomplish the de-skewing of the channel data. To support the rotating deinterleaving/interleaving procedures described herein, each of the framers 604 may be configured to generate N frame pulses per detected FAS. The additional frame pulses enable de-skewing circuit 606 to align the incoming data streams. Otherwise, the frame pulses may occur too infrequently to be utilized for direct de-skewing.

The de-skewed data is processed by rotating interleaver 608 in accordance with the rotating interleaving procedure described herein. Groups of bytes enter rotating interleaver 608 simultaneously from each channel, however, rotating interleaver 608 outputs groups of bytes sequentially. In the example embodiment, rotating interleaver 608 receives groups of 16 bytes from each of the four channels simultaneously (i.e., a parallel input of 64 bytes). Consequently, a practical rotating interleaver 608 has sufficient data storage capacity to accommodate its functionality. Rotating interleaver 608 is suitably configured to distribute data from the subframe structures into an appropriate data frame format, e.g., into digital wrapper frames. In other words, rotating interleaver 608 can recreate data frames processed by data communication apparatus 500. In this regard, rotating interleaver 608 reverses the effect of the rotating deinterleaving procedure. Eventually, the recreated data frames can be transmitted over a single channel at the original data rate (10 Gbps for digital wrapper frames).

Figure 7:
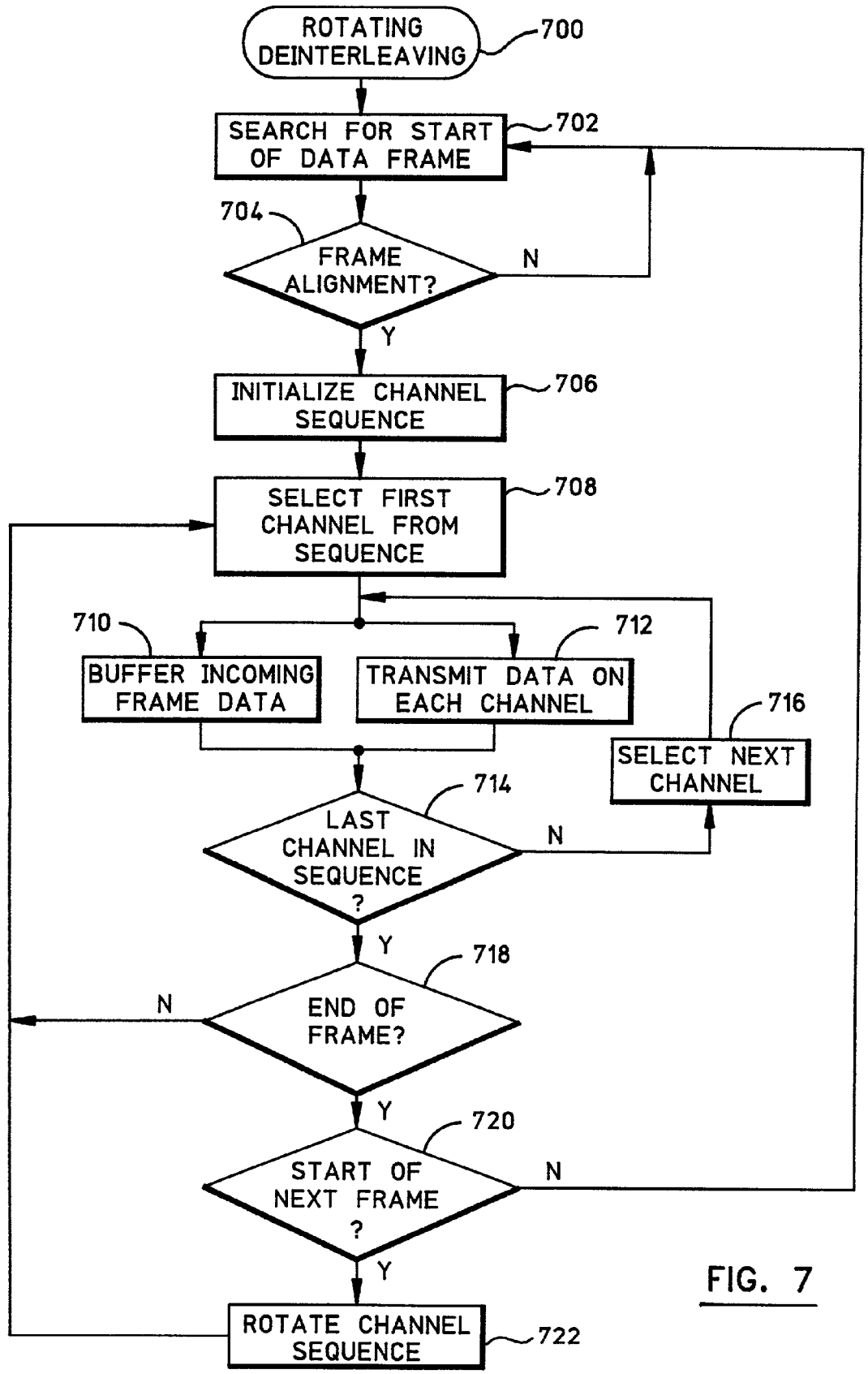
FIG. 7 is a flow diagram of a rotating deinterleaving process.

FIG. 7 is a flow diagram of a rotating deinterleaving process 700 that may be performed by deinterleaver 504 (see FIG. 5) to reformat data received in an incoming data frame into a plurality of subframe structures. In the example embodiment, process 700 can be performed by one or more components of port card 202, such as framer 502 and transceiver 212, under microprocessor control. The tasks in process 700 may be carried out by hardware, software, firmware, or a combination thereof, and any number of alternative or additional tasks may be performed in a practical embodiment.

Rotating deinterleaving process 700 is performed in response to incoming data frames formatted in accordance with a specified protocol, e.g., digital wrapper frames. Process 700 begins by searching for the start of an incoming data frame (task 702). Task 702 may be performed by framer 502 in accordance with known frame alignment techniques. Task 702 continues until frame synchronization and alignment is obtained. If frame alignment has been established and the start of a data frame has been determined (query task 704), then a task 706 can be initiated.

Task 706 initializes the channel sequence to establish an ordering or numbering of the N low bandwidth channels (in the example embodiment, N=4). In other words, task 706 initializes a channel sequence as follows: [CH_1, CH_2, ..., CH_N], and assigns the channel sequence to the physical channels used for the transmission of the subframe structures. For the example embodiment, task 706 may initialize the channel sequence in the following manner: CH_1=Channel A; CH_2=Channel B; CH_3=Channel C;

and CH_4=Channel D. Of course, the physical channels can be assigned to the channel sequence in any desired order.

After the channel sequence has been initialized, rotating deinterleaving process 700 selects the first channel from the channel sequence, i.e., CH_1 (task 708). Thereafter, process 700 performs a number of parallel operations (represented by task 710 and task 712). Task 710 buffers B bytes from the incoming data frame in a buffer assigned to the current channel, where B is the number of bytes taken from the data frame for consecutive transmission through the selected channel. In this regard, port card 202 may include one or more buffer memory elements having sufficient storage capacity to accommodate the incoming data rate, the outgoing data rates, the number of outgoing low bandwidth channels, the number of bytes (B) taken from the incoming data frame at each iteration, and possibly other functional characteristics of the data communication system. In a practical embodiment transceiver 212 may utilize N buffers, each assigned to one of the N channels.

Initially, task 710 buffers the first B bytes located at the beginning of the incoming data frame. In the example digital wrapper embodiment where B=16, the first group of data frame bytes will include the six FAS bytes. Task 712 may be performed concurrently with task 710 to transmit the reformatted data on each of the N channels (some of the channels may not transmit intelligible data during the initial iterations of rotating deinterleaving process 700). In particular, task 712 concurrently transmits B/N bytes (taken from the respective buffer memory locations) on each of the N channels, thus resulting in a combined effective transmission of B bytes per iteration. Only B/N bytes are transmitted on each of the N channels due to the lower bandwidth of the channels relative to the incoming data frame. For each iteration, however, B bytes are buffered and B bytes are transmitted. In this manner, the data rate of the incoming data frame is effectively maintained by the N channels.

In a practical embodiment, N groups of B bytes are stored in buffer memory (task 710) before the initial transmission of B/N bytes on any of the N channels. Thus, B/N bytes from each of the N buffers can be transmitted together at each iteration. In this regard, the respective groups of B/N bytes are aligned with one another during task 712. Depending upon the phase of the rotation, any physical channel can be the source of the first group of B/N bytes. Accordingly, transmitting the groups of B/N bytes in alignment is desirable to enable the destination device to efficiently perform the reverse process of rotating interleaving.

If the current channel is the last channel in the sequence (query task 714), then rotating deinterleaving process 700 proceeds to a query task 718. If more channels remain in the channel sequence, then the next channel in the sequence is selected (task 716) and process 700 is reentered such that task 710 buffers more data from the incoming data frame and task 712 continues to transmit subframe data on the individual channels. In the practical embodiment, the buffer(s) store the data in the order in which it appears in the incoming data frame. At the end of a channel sequence, query task 718 determines whether the current incoming data frame has ended. If not, then rotating deinterleaving process 700 is reentered at task 708 to restart the channel sequencing. Thus, tasks 708, 710, 712, 714, 716, and 718 form a loop during which data from the current data frame is deinterleaved to form N subframe structures for transmission via the N channels.

At the end of the current incoming data frame, a query task 720 may be performed to check whether the next incoming data frame has started. A negative determination will occur as a result of a framing error and should not occur during normal operation. If, however, this should occur, then rotating deinterleaving process 700 can be reentered at task 702 in an attempt to reestablish frame alignment. Assuming that the next incoming data frame has been properly received, a task 722 is performed to rotate the initialized channel sequence and form a new channel sequence. Task 722 ensures that the first channel selected in task 708 sequentially changes for each new incoming data frame, thus distributing the FAS periodically in each subframe structure. Thus, N different channel sequences will be generated by process 700. The channel sequences will follow this general pattern:

[CH_1, CH_2, . . . , CH_(N-1), CH_N]
[CH_2, . . . , CH_(N-1), CH_N, CH_1]
. . .
[CH_N, CH_1, CH_2, . . . , CH_(N-1)].

In the example four-channel embodiment described herein, the channel sequences will follow this pattern:

[CH_1, CH_2, CH_3, CH_4]
[CH_2, CH_3, CH_4, CH_1]
[CH_3, CH_4, CH_1, CH_2]
[CH_4, CH_1, CH_2, CH_3].

Task 708 is reentered after the channel sequence has been rotated such that the next incoming data frame is deinterleaved beginning with a new "first channel" in the sequence.

Figure 8:
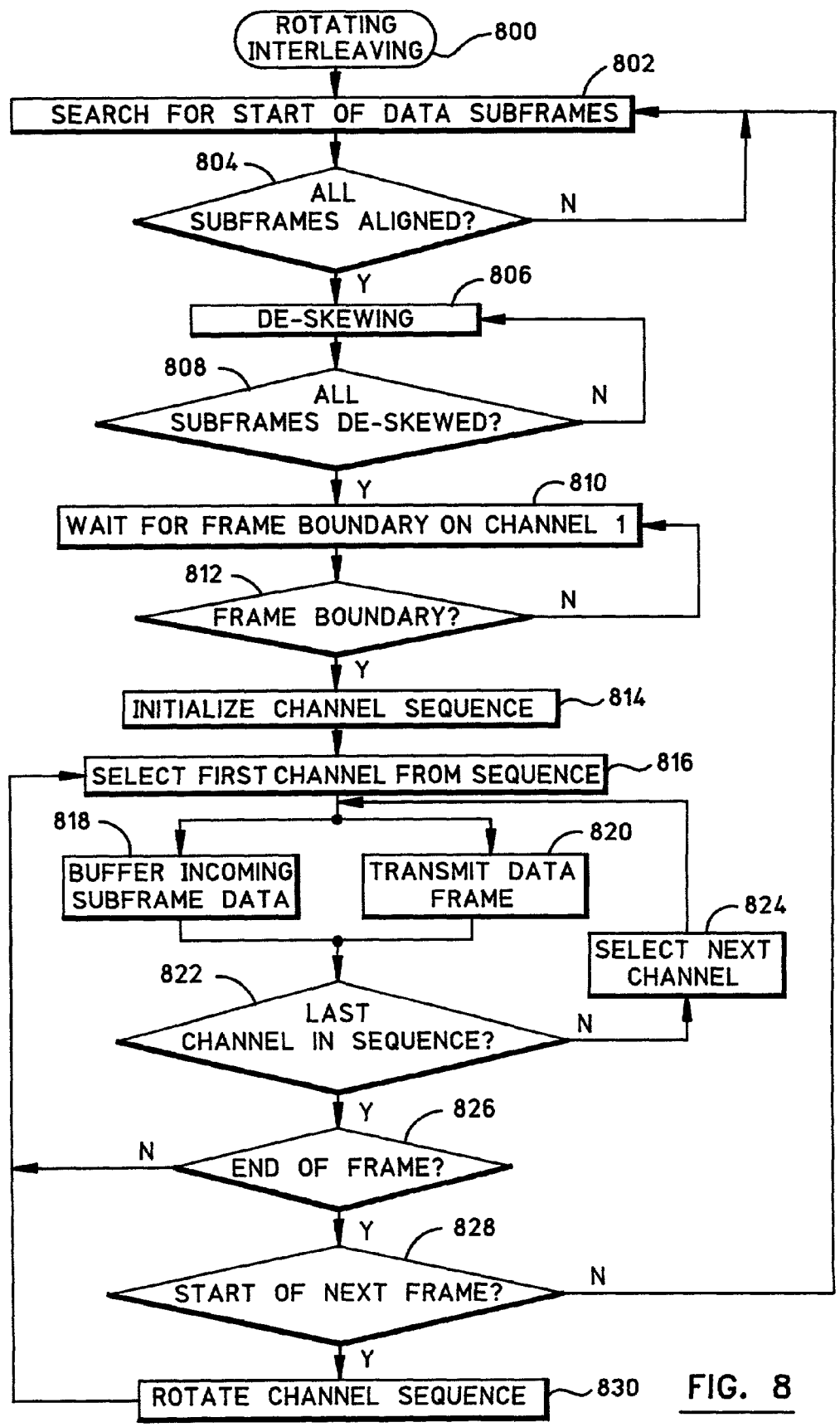
FIG. 8 is a flow diagram of a rotating interleaving process.

FIG. 8 is a flow diagram of a rotating interleaving process 800 that may be performed by interleaver 608 (see FIG. 6) to reformat data received in a plurality of subframe structures into a data frame structure suitable for transmission over a single communication channel. In the example embodiment, process 800 can be performed by one or more components of port card 202, such as transceiver 212, under microprocessor control. The tasks in process 800 may be carried out by hardware, software, firmware, or a combination thereof, and any number of alternative or additional tasks may be performed in a practical embodiment.

Rotating interleaving process 800 is performed in response to a number of incoming data subframes formatted in accordance with the rotating deinterleaving procedure described above. Process 800 begins by searching for the start of the incoming subframe structures (task 802). Task 802 may be performed by framers 604 in accordance with known frame alignment techniques. Task 802 continues until synchronization and alignment is obtained for all of the subframes. If alignment has been established and the start of a data subframe has been determined (query task 804), then a task 806 can be initiated.

If frame synchronization has been established for each of the individual subframes, then task 806 is performed to de-skew the subframes. As described above in connection with de-skewing circuit 606, the data received on the N channels is de-skewed such that the correct data can be retrieved from each subframe using a common clock signal. Task 806 continues until all of the subframes have been de-skewed relative to each other. If the subframes have been de-skewed (query task 808), then rotating interleaving process 800 proceeds to a task 810. During task 810, process 800 waits for the frame boundary at one of the channels, e.g., Channel A. In other words, process 800 monitors one of the physical channels to detect the boundary of a subframe received on that channel.

When the subframe boundary has been detected (query task 812), the channel sequence is initialized (task 814) and the first channel in the channel sequence is selected (task 816). Tasks 814 and 816 are equivalent to tasks 706 and 708, respectively, described above in connection with rotating deinterleaving process 700. Thereafter, process 800 performs a number of parallel operations (represented by task 818 and task 820). Task 818 buffers B/N bytes from each of the incoming subframes in respective buffer memory locations assigned to each channel. As described above, port card 202 may include one or more buffer memory elements having sufficient storage capacity to accommodate the needs of rotating interleaving process 800.

Task 818 may be performed concurrently with task 820, which transmits the reformatted data on a single channel. In particular, task 820 transmits B bytes (taken from the respective buffer memory locations) on an output channel. The data on the output channel is formatted in accordance with the original data frame format, e.g., the digital wrapper data frame format. In the preferred practical embodiment, groups of B/N bytes arrive simultaneously on each of the N channels, and B bytes from each channel are buffered before task 820 transmits B bytes on the first channel of the sequence, followed by B bytes on the second channel of the sequence, and so on.

If the current channel is the last channel in the sequence (query task 822), then rotating interleaving process 800 proceeds to a query task 826. If more channels remain in the channel sequence, then the next channel in the sequence is selected (task 824) and process 800 is reentered such that task 818 buffers more data from the individual channels and task 820 continues to transmit reformatted frame data on the single output channel. At the end of a channel sequence, query task 826 determines whether the current outgoing data frame has ended. If not, then rotating interleaving process 800 is reentered at task 816 to restart the channel sequencing. Thus, tasks 816, 818, 820, 822, 824, and 826 form a loop during which data from the N incoming subframes is interleaved to form a recreated data frame structure for transmission via the output channels.

At the end of the current incoming data frame, a query task 828 may be performed to check whether the next incoming data frame has started. A negative determination will occur as a result of a framing error and should not occur during normal operation. If, however, this should occur, then rotating interleaving process 800 can be reentered at task 802 in an attempt to reestablish frame alignment. Assuming that the next incoming data frame has been properly received, a task 830 is performed to rotate the initialized channel sequence and form a new channel sequence. Task 830 is equivalent to task 722 described above in connection with rotating deinterleaving process 700. Task 816 is reentered after the channel sequence has been rotated.

In summary, the techniques of the present invention can be utilized to receive data frames, formatted in accordance with a first protocol, at a first data rate. A rotating deinterleaving procedure is performed to rearrange the incoming data into a plurality of subframe structures for transmission over a like plurality of communication channels at a second data rate that is less than the first data rate. In the example serial backplane embodiment described herein, incoming digital wrapper frames (10 Gbps data rate) are reformatted into four subframe structures for transmission on four serial channels (2.5 Gbps data rate per channel). At the destination port, the data contained in the plurality of subframes is processed to recreate the original data frame format. Thereafter, the recreated data frames can be transmitted at the first data rate to another destination.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A method of formatting a distributed data frame structure comprising:
   receiving a plurality of data frames, each data frame comprising a plurality of bytes and a frame alignment signal comprising a pattern of bits;
   establishing a plurality of subframe structures, each subframe structure corresponding to one of a plurality of different transmission channels; and
   performing a rotating deinterleaving procedure on said plurality of data frames in which:
   an instance of said frame alignment signal is periodically distributed within each of said plurality of subframe structures by:
   assigning a first instance of said frame alignment signal to a reference location in a first one of said plurality of subframe structures to identify a reference position in a first one of said data frames; and
   assigning at least a second instance of said frame alignment signal to a reference location in at least a second one of said plurality of subframe structures to identify a reference position in at least a second one of said data frames.

2. The method according to claim 1, wherein said rotating deinterleaving procedure distributes bytes from each of said plurality of data frames among each of said plurality of subframe structures.

3. The method according to claim 1, wherein:
   each of said plurality of bytes is L bytes; and
   said rotating deinterleaving procedure distributes said frame alignment signal such that it occurs every L bytes in each of said subframe structures.

4. The method according to claim 1, wherein each of said plurality of data frames is formatted in accordance with ITU-T Recommendation G.709/Y.1331.

5. A data communication apparatus comprising:
   an input module configured to obtain a plurality of data frames, each data frame comprising a plurality of bytes and a frame alignment signal comprising a pattern of bits; and
   a rotating deinterleaver configured to reformat said data frames into a plurality of subframe structures, each subframe structure corresponding to one of a plurality of different transmission channels;
   means in said rotating deinterleaver for performing a rotating deinterleaving procedure on said plurality of data frames in which an instance of said frame alignment signal is periodically distributed within each of said plurality of subframe structures by;
   assigning a first instance of said frame alignment signal to a reference location in a first one of said plurality of subframe structures to identify a reference position in a first one of said data frames; and
   assigning at least a second instance of said frame alignment signal to a reference location in at least a second one of said plurality of subframe structures to identify a reference position in at least a second one of said data frames.

6. The data communication apparatus according to claim 5, further comprising a plurality of serializers coupled to said rotating deinterleaver, each of said plurality of serializers being configured to generate serial data representing one of said plurality of subframe structures.

7. The data communication apparatus according to claim 5, further comprising a framer configured to align said plurality of data frames.

8. A data communication method comprising:
receiving a plurality of data frames at a first data rate, each data frame comprising a plurality of bytes and a frame alignment signal comprising a pattern of bits;
performing a rotating deinterleaving procedure to distribute data from said plurality of data frames into a plurality of subframe structures, in which an instance of said frame alignment signal is periodically distributed within each of said plurality of subframe structures by:
assigning a first instance of said frame alignment signal to a reference location in a first one of said plurality of subframe structures to identify a reference position in a first one of said data frames; and
assigning at least a second instance of said frame alignment signal to a reference location in at least a second one of said plurality of subframe structures to identify a reference position in at least a second one of said data frames; and
transmitting each of said plurality of subframe structures over a respective one of a plurality of channels, each of said plurality of subframe structures being transmitted at a second data rate less than said first data rate.

9. The method according to claim 8, wherein each data frame is formatted in accordance with ITU-T Recommendation G.709/Y.1331.

10. The method according to claim 8, further comprising:
receiving said plurality of subframe structures on said plurality of channels;
framing each of said plurality of subframe structures to obtain aligned subframe structures; and
performing a rotating interleaving procedure on said aligned subframe structures to recreate said plurality of data frames.

11. The method according to claim 10, further comprising de-skewing said aligned subframe structures.

12. The method according to claim 10, wherein said rotating interleaving procedure reverses the effect of said rotating deinterleaving procedure.

13. The method according to claim 10, further comprising transmitting recreated data frames over a single channel at said first data rate.

14. A data communication apparatus comprising:
at least one input module configured to obtain a plurality of subframe structures from a plurality of channels, each of said plurality of subframe structures comprising a plurality of bytes and a frame alignment signal which is periodically distributed within each subframe structure such that:
a first instance of said frame alignment signal is at a reference location in a first one of said plurality of subframe structures to identify a reference position in a first one of said data frames; and
at least a second instance of said frame alignment signal is at a reference location in at least a second one of said plurality of subframe structures to identify a reference position in at least a second one of said data frames; and
a rotating interleaver configured to distribute data from said plurality of subframe structures into a data frame.

15. The apparatus according to claim 14, further comprising a plurality of framers configured to frame said plurality of subframe structures to obtain aligned subframe structures.

16. The apparatus according to claim 15, further comprising a de-skewing circuit configured to de-skew said aligned subframe structures, wherein said rotating interleaver is coupled to receive de-skewed data from said de-skewing circuit.

17. A data communication method comprising:
receiving, at a first data rate, a plurality of subframe structures from a plurality of channels, each of said plurality of subframe structures comprising a plurality of bytes and a frame alignment signal which is periodically distributed within each subframe structure such that:
a first instance of said frame alignment signal is at a reference location in a first one of said plurality of subframe structures to identify a reference position in a first one of said data frames; and
at least a second instance of said frame alignment signal is at a reference location in at least a second one of said plurality of subframe structures to identify a reference position in at least a second one of said data frames; and
performing a rotating interleaving procedure to distribute data from said plurality of subframe structures into a data frame formatted for transmission at a second data rate higher than said first data rate.

18. The method according to claim 17, wherein said data frame is formatted in accordance with ITU-T Recommendation G.709/Y.1331.

19. The method according to claim 17, further comprising framing each of said plurality of subframe structures to obtain aligned subframe structures.

20. The method according to claim 19, further comprising de-skewing said aligned subframe structures.

21. The method according to claim 17, further comprising transmitting recreated data frames over a single channel at said second data rate.

* * * * *